US008624859B2

(12) United States Patent
Aono

(10) Patent No.: US 8,624,859 B2
(45) Date of Patent: Jan. 7, 2014

(54) INPUT APPARATUS

(75) Inventor: Tomotake Aono, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/121,138

(22) PCT Filed: Dec. 25, 2009

(86) PCT No.: PCT/JP2009/007318
§ 371 (c)(1),
(2), (4) Date: Mar. 25, 2011

(87) PCT Pub. No.: WO2010/073731
PCT Pub. Date: Jul. 1, 2010

(65) Prior Publication Data
US 2011/0181539 A1  Jul. 28, 2011

(30) Foreign Application Priority Data
Dec. 25, 2008   (JP) .................................. 2008-331272

(51) Int. Cl.
*G09G 5/00* (2006.01)
(52) U.S. Cl.
USPC ........................... 345/173; 178/18.03; 463/37
(58) Field of Classification Search
USPC ......... 345/173, 174; 173/18.03, 18.05, 18.06, 173/18.07; 715/864, 863; 463/37; 178/18.01, 18.02, 18.03
See application file for complete search history.

(56) References Cited
U.S. PATENT DOCUMENTS

| 5,053,585 | A | * | 10/1991 | Yaniger ...................... 178/18.05 |
| 6,295,052 | B1 | | 9/2001 | Kato et al. |
| 6,377,685 | B1 | | 4/2002 | Krishnan |
| 7,609,178 | B2 | * | 10/2009 | Son et al. ......................... 341/33 |
| 7,614,008 | B2 | * | 11/2009 | Ording ........................... 715/773 |
| 7,685,538 | B2 | * | 3/2010 | Fleck et al. .................... 715/863 |
| 2002/0110237 | A1 | | 8/2002 | Krishnan |
| 2003/0151589 | A1 | | 8/2003 | Bensen et al. |
| 2004/0008191 | A1 | | 1/2004 | Poupyrev et al. |
| 2004/0021643 | A1 | | 2/2004 | Hoshino et al. |

(Continued)

FOREIGN PATENT DOCUMENTS

| CN | 1216620 A | 5/1999 |
| EP | 1 967 290 A1 | 9/2008 |

(Continued)

OTHER PUBLICATIONS

International Search Report issued in Application No. PCT/JP2009/007318; Dated Apr. 13, 2010 (With Translation).
Dec. 13, 2011 Office Action issued in U.S. Appl. No. 13/120,814.
European Search Report issued in European Patent Application No. 09834534.1 dated May 8, 2012.

(Continued)

*Primary Examiner* — Tom Sheng
(74) *Attorney, Agent, or Firm* — Oliff & Berridge, PLC

(57) ABSTRACT

The input apparatus has an input unit for receiving a pressure input to an input object displayed on the display unit, a load detection unit for detecting a pressure load on the input unit, and a control unit for controlling to receive the pressure input if the pressure load satisfies a load standard. The control unit controls such that load standards for receiving pressure inputs to a plurality of adjacent input objects are differently set to a first load standard and a second load standard higher than the first load standard, and controls such that if a pressure load of a pressure input to an input object with the first load standard satisfies the second load standard, the pressure input is not received.

2 Claims, 14 Drawing Sheets

(56) References Cited

U.S. PATENT DOCUMENTS

| | | | |
|---|---|---|---|
| 2005/0044500 A1 | 2/2005 | Orimoto et al. | |
| 2006/0001654 A1* | 1/2006 | Smits | 345/176 |
| 2006/0053387 A1 | 3/2006 | Ording | |
| 2006/0061597 A1 | 3/2006 | Hui | |
| 2008/0024459 A1 | 1/2008 | Poupyrev et al. | |
| 2008/0122315 A1 | 5/2008 | Maruyama et al. | |
| 2008/0216001 A1 | 9/2008 | Ording et al. | |
| 2008/0252616 A1 | 10/2008 | Chen | |
| 2008/0303799 A1* | 12/2008 | Schwesig et al. | 345/173 |
| 2010/0026640 A1 | 2/2010 | Kim et al. | |
| 2010/0026647 A1 | 2/2010 | Abe et al. | |
| 2010/0039393 A1* | 2/2010 | Pratt et al. | 345/173 |
| 2010/0103127 A1* | 4/2010 | Park et al. | 345/173 |
| 2011/0169765 A1* | 7/2011 | Aono | 345/173 |
| 2011/0181539 A1 | 7/2011 | Aono | |

FOREIGN PATENT DOCUMENTS

| | | |
|---|---|---|
| EP | 2 000 896 A2 | 12/2008 |
| GB | 2 402 105 A | 12/2004 |
| JP | A-05-143226 | 6/1993 |
| JP | A-6-161660 | 6/1994 |
| JP | A-8-76925 | 3/1996 |
| JP | A-9-62446 | 3/1997 |
| JP | A-10-171600 | 6/1998 |
| JP | A-2001-331245 | 11/2001 |
| JP | A-2005-196810 | 7/2005 |
| JP | A-2005-332063 | 12/2005 |
| JP | A-2006-311224 | 11/2006 |
| JP | B2-4039344 | 1/2008 |
| JP | A-2008-107906 | 5/2008 |
| JP | A-2008-123453 | 5/2008 |
| JP | A-2006-195734 | 7/2008 |
| JP | A-2010-152716 | 7/2010 |
| JP | A-2010-152736 | 7/2010 |
| WO | WO 00/65419 A2 | 11/2000 |

OTHER PUBLICATIONS

European Search Report issued in European Patent Application No. 09834535.8 dated May 10, 2012.
Apr. 27, 2012 Office Action issued in U.S. Appl. No. 13/120,812.
International Search Report for International Patent Application No. PCT/JP2009/007315, mailed on Mar. 16, 2010 (with translation).
Written Opinion for International Patent Application No. PCT/JP2009/007315, mailed on Mar. 16, 2010 (with partial translation).
International Search Report dated Apr. 13, 2010 in corresponding International Application No. PCT/JP2009/007316 (with translation).
Jun. 20, 2011 Office Action issued in U.S. Appl. No. 13/120,814.
Oct. 7, 2011 Office Action issued in U.S. Appl. No. 13/120,812.
U.S. Appl. No. 13/120,814, Published Jul. 14, 2011.
U.S. Appl. No. 13/120,812, Published Jul. 28, 2011.
Feb. 5, 2013 Search Report issued in European Patent Application No. 09834534.1.
Nov. 6, 2012 Office Action issued in Korean Patent Application No. 10-2011-7012990 (with English Translation).
Nov. 12, 2012 Office Action issued in Korean Patent Application No. 10-2011-7012582 (with English Translation).
Mar. 26, 2013 Notification of Reason for Refusal issued in Japanese Patent Application No. 2011-107517 (with translation).
Mar. 26, 2013 Notification of Reason for Refusal issued in Japanese Patent Application No. 2011-107616 (with translation).
Apr. 12, 2013 Office Action issued in Chinese Patent Application No. 200980151358.1 (with translation).
Feb. 5, 2013 Office Action issued in European Patent Application No. 09834535.8.
Jun. 9, 2013 Office Action issued in Chinese Patent Application No. 200980151363.2 (with translation).
Aug. 26, 2013 Office Action issued in European Patent Application No. 09834534.1.

* cited by examiner

FIG. 3
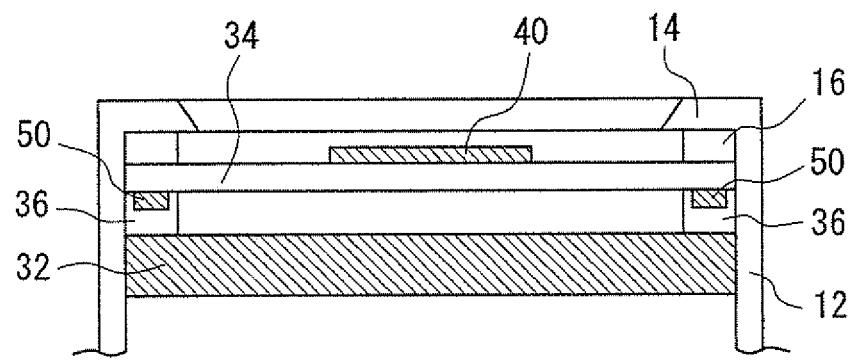
(A)
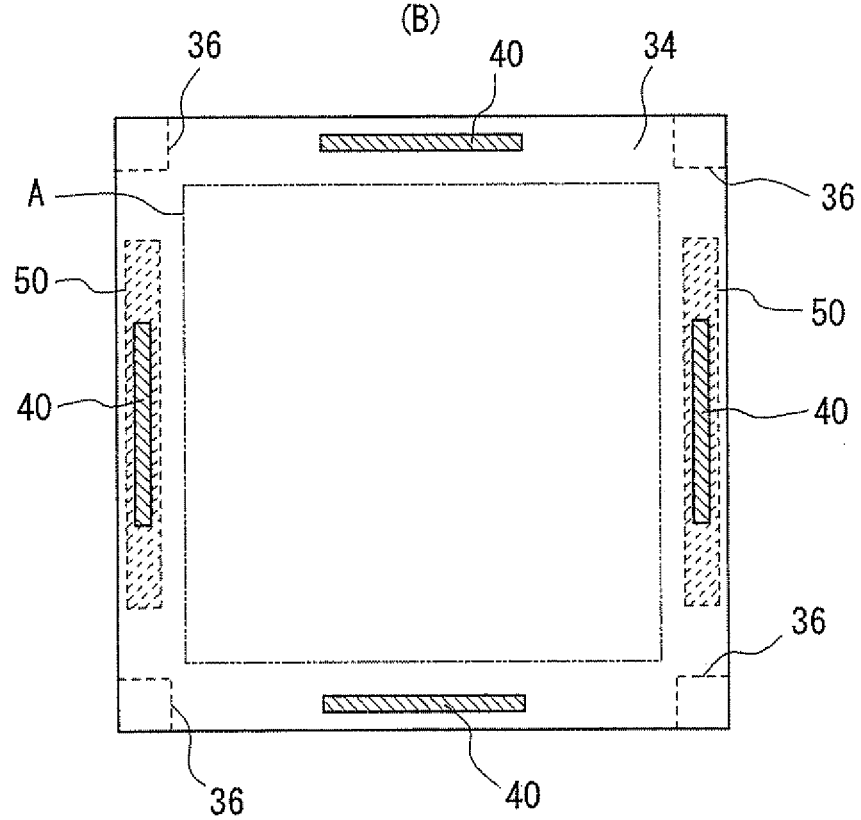
(B)

FIG. 6

FIG. 10
(A) (B) (C)
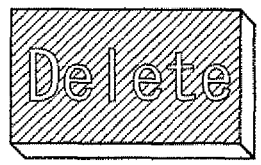 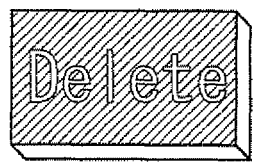 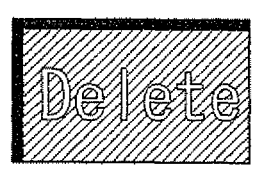

INPUT APPARATUS

CROSS REFERENCE TO RELATED APPLICATION

This application claims priority to and the benefit of Japanese Patent Application No. 2008-331272 filed on Dec. 25, 2008, the entire contents of which are incorporated herein by reference.

TECHNICAL FIELD

The present invention relates to input apparatuses, and more particularly, to input apparatuses having touch panels.

BACKGROUND ART

For mobile terminals such as mobile phones, various input apparatuses used by users to operate the terminals have been developed in a variety of manners according to functions and usages of each of the terminals. In many cases, an input apparatus has mechanical keys or buttons arranged in advance on a surface of a body such that a user performs an input operation by directly pressing a finger or the like to the keys.

The mechanical keys (for example, a numerical keypad) of the input apparatus of the terminal are normally arranged in advance to suit a main usage of the terminal. Accordingly, it is generally not possible to change a physical arrangement of keys, once defined, later.

Recently, a variety of functions are incorporated in small mobile terminals. For example, the mobile phones have a digital camera function and a music player function. There are mobile terminals such as a mobile phone having numerous supplementary functions incorporated therein in addition to a function for a main usage of the terminal, and PDA (Personal Digital Assistant: mobile information terminal) having, as a single terminal, a plurality of main usages such as schedule management, an address book and the like. If such terminals have keys fixedly arranged, it may inconvenience the user significantly in using particular functions.

In order to resolve such inconvenience, there is disclosed an input apparatus having a touch panel designed such that a transparent input unit is arranged overlapping a front face of a liquid crystal display constituting a display unit (for example, see Patent Document 1). The input apparatus having such a touch panel generally displays graphical images of operation keys and buttons (hereinafter, referred to as "input objects") on a display screen of the touch panel. When the user presses an input object displayed on the display screen, an input unit at a corresponding position on the touch panel receives an input.

A folding mobile phone described in the above Patent Document 1 can display input objects arbitrarily arranged on the display screen of the touch panel to receive input operations by the user, and thus key arrangements can be designed as desired. Accordingly, this mobile phone may provide an excellent operability, as capable of changing the arrangement of the input objects as desired to suit a function when each function of the terminal is switched. For example, when the user uses a digital camera function implemented in the mobile phone, this mobile phone may display input objects constituting an operation unit for a digital camera on the touch panel and receive operation inputs. On the other hand, when the user inputs characters in messages using the mobile phone, the mobile phone may display an input object constituting a keyboard like a personal computer (PC) on the touch panel and receive inputs. As stated above, this mobile phone having the touch panel can optimize a single input apparatus to suit each of a plurality of functions and receive operation inputs.

In addition, since the input apparatus having the touch panel receives an input in the form of a user's direct contact (touch) of a finger or the like to the input object displayed on the display unit, the user can operate it highly intuitively. That is, the user operates the input apparatus by directly touching the input object displayed on the screen with a finger or the like following a guide displayed on the screen of the touch panel. Accordingly, the user can operate the terminal extremely easily through intuitive operations following the guide displayed on the screen, which offers an effect to reduce incorrect operations as a result.

In recent years, the mobile terminal having the touch panel as stated above enables the user not only to make a normal telephone call and to perform operation inputs for creating a message but also to perform operation inputs to view (browse) contents delivered through the internet and websites. In addition, the input apparatuses having the touch panel are commonly used for not only the mobile terminals but also, for example, ATMs (Automatic Teller Machines) of a bank and the like and ticket vending machines at train stations. Moreover, in stores such as fast-food shops, terminal equipment with the input apparatus having the touch panel as above is used by a clerk to process orders from customers. When the touch panel is employed as the input apparatus, the mechanical buttons and keys such as the keyboard are not essential components any more. Accordingly, since only a small area is required to arrange mechanical buttons and the like on the terminal apparatus, it enables downsizing of overall terminal apparatus. Therefore, it offers a broader choice of installation sites of the terminal apparatus in the stores and train stations.

In addition, the touch panel employed as the input apparatus eliminates the necessity of separately having a display unit for displaying various information and an input unit for receiving operation inputs by the user as individual function units like a general design of conventional apparatus, and enables to configure the information display unit and the input unit on the same screen. Accordingly, it is possible, for example, to display input object constituting keys of a keyboard on the touch panel to receive an input by the user while displaying a result of the input near the keyboard on the touch panel. Thereby, the user can perform an operation input and confirm the result of the input on the same screen.

As described above, the touch panel provides merits to enable to configure the input unit and the display unit on the same screen and also to enable intuitive operation inputs. For that reason, the number of terminal apparatuses having such input apparatus has been increased more and more.

However, the input apparatus with the touch panel has a specific problem because of its configuration to have the input unit and the display unit on the same screen and to receive the intuitive operation input. That is, although the touch panel can constitute the display unit arranging the input objects as desired, it is difficult for the user to determine a boundary between an input object and another area by a tactile sensation because a surface of the input unit is generally flat. In addition, since the user directly touches the input unit with a finger or a stylus in order to input to the touch panel, the input object is covered at the moment of the pressure input, preventing the user from visually confirming the input object to receive the operation input.

Accordingly, since the user cannot determine, with a feeling on the finger, whether the finger is touching an input object, there is always a possibility to press an unintended position. That is, there is a risk of pressing a position elsewhere than an intended input object by pressing a position slightly off from it or a risk of pressing another input object adjacent to the intended input object. When pressing an input object with a finger, a risk of unintended input becomes higher, as the input object is covered with the finger.

In addition, if the unintended input of the user is received by the input apparatus, an operation that the user does not intend may be started in response to the input. In such a case, the user must perform an additional operation to stop (cancel) the unintended operation. Moreover, if an important processing or operation being performed is stopped because of the unintended operation, it may cause an unrecoverable situation. Accordingly, it is desired to reduce a risk that such an unintended operation is started based on the unintended input by the user, as much as possible.

As a scheme capable of handling such a condition, there is suggested an input apparatus having a means to detect an input pressure to the touch panel and is configured to change a height of a surface of the touch panel in accordance with a position and the pressure of the input to the touch panel by the user (for example, see Patent Document 2).

PRIOR ART DOCUMENTS

Patent Documents

Patent Document 1: Japanese Patent Laid-Open No. 2006-311224
Patent Document 2: Japanese Patent No. 4039344

SUMMARY OF INVENTION

Technical Problem

According to the input apparatus described in the above Patent Document 2, when there is a user's input to an input object displayed on the display unit of the touch panel, it is possible to indicate that the user is touching the input object, by changing the height of the touch panel. That is, when the user touches an input object, this input apparatus indicates that the position touched by the user corresponds to an input object, by lifting the surface of the touch panel higher than a level when the user touches an area elsewhere than an input object. In addition, when recognizing a light touch by the user to a position corresponding to an input object of the touch panel, this input apparatus enlarges an image of the input object to allow for better viewability (for example, see FIG. 7 and FIG. 10 of Patent Document 2). With a variety of measures taken as stated above, the input apparatus described in Patent Document 2 helps the user to input avoiding erroneous operations.

According to this input apparatus, the user can determine, with the feeling on the finger, whether there is an input object at a position of the touch panel that the finger is touching. In addition, as capable of enlarging the image of the input object being touched by the user, this input apparatus can relatively reduce an area covered with the finger touching the input object. Accordingly, this input apparatus can reduce the risk of receiving unintended inputs by the user.

However, there are disadvantages when such a technique is applied to a small mobile terminal such as the mobile phone, for example. That is, a mechanism to change the height of the surface of the touch panel as stated above requires a considerable width wider than the variation width of the surface of the touch panel. This is because a mechanical drive apparatus to change the height of the touch panel needs to be in a certain size at least and also because it is necessary to secure a space to allow for a change in the height of overall touch panel. In recent development of the mobile phone, it is desired to minimize its size as much as possible and thus it is anticipated to present a technical difficulty in mounting such a mechanism for changing the height of the surface of the touch panel in a body of the mobile phone.

In addition, in case of a small mobile terminal such as a mobile phone, unlike large terminals such as the ATMs of a bank and the ticket vending machines at a train station, the touch panel serving also as a display unit is substantially limited in size, and thus the display unit for displaying input objects is small in size inevitably. On the other hand, although being small in size, the mobile terminal needs to display a number of input objects of various types, in order to receive various inputs to the touch panel by the user. Accordingly, it is considered that there is difficulty for the mobile terminal to display an enlarged image of an input object when a user touches the input object.

Moreover, when a number of input objects are displayed on the touch panel limited in size, it is considered that it is difficult to virtually indicate whether the location the user is touching corresponds to an input object, by changing the height of the touch panel as stated above. Especially, if a number of input objects limited in size are arranged at adjacent positions, there is little or no space between them. Therefore, it is considered that it is very difficult to enable the user to recognize an edge portion (a portion corresponding to an edge of a key) of each of the input objects by changing the height of the touch panel. Accordingly, it is considered that, when a number of small input objects are displayed at adjacent positions on the touch panel of the small mobile terminal such as the mobile phone, it is difficult to reduce user's incorrect inputs by applying the above scheme described in the Patent Document 2.

If multiple input objects are displayed at adjacent positions on a small touch panel, it is generally difficult for the user to distinctly input to each of the input objects. Accordingly, there is a possibility that the user performs an incorrect operation against an intention and an unintended operation starts based on the incorrect operation.

In addition, the small mobile terminal such as the mobile phone has a particular condition not only to display multiple input objects on the touch panel limited in size but also to receive user's inputs while the user is walking or performing another operation. It is desired to receive inputs to multiple input objects as intended by the user and also to avoid incorrect operations by the user, even if the user is not looking at the input unit. Moreover, an input apparatus is desired which, if the user performs an incorrect input unintentionally, avoids starting an unintended operation based on the input.

Accordingly, an object of the present invention in consideration of such conditions is to provide an input apparatus capable of avoiding incorrect operations based on a user's incorrect operation in receiving pressure inputs to a plurality of adjacent input objects on a touch panel mounted on, for example, a mobile phone.

Solution to Problem

In order to achieve the above object, an input apparatus according to a first aspect of the present invention includes:
a display unit for displaying an input object;
an input unit for receiving a pressure input to the input object displayed on the display unit;
a load detection unit for detecting a pressure load on the input unit; and a control unit for controlling to receive the pressure input if the pressure load detected by the load detection unit satisfies a load standard, wherein the control unit controls such that load standards for receiving pressure inputs to a plurality of adjacent input objects are differently set to a first load standard and a second load standard higher than the first load standard, and controls such that a pressure input is not received if a pressure load of the pressure input to an input object with the first load standard satisfies the second load standard.

A second aspect of the present invention is that, in the input apparatus according to the first aspect, the control unit controls such that a pressure input is not received if a pressure load of the pressure input to an input object with the first load standard falls down to be lower than the second load standard after satisfying the second load standard.

BRIEF DESCRIPTION OF DRAWINGS

FIG. 3 shows diagrams illustrating an exemplary implementation structure of a touch panel, a load detection unit and a vibration unit of the mobile phone shown in FIG. 2;

FIG. 6 shows exemplary displays on the display unit based on the input object load standard setting processing according to the embodiment;

FIG. 10 shows diagrams illustrating a highlight display and a pressed-down display according to the embodiment;

DESCRIPTION OF EMBODIMENT

An embodiment of the present invention will be described with reference to the accompanying drawings. In the following embodiments, a mobile phone is used as an exemplary mobile terminal with an input apparatus according to the present invention. However, the mobile terminal to which the input apparatus according to the present invention is applicable is not only the mobile phone but also any mobile terminal having a touch panel such as a PDA, for example. In addition, the present invention is applicable not only to the mobile terminal having the touch panel but also to any input terminal having the touch panel such as ATMs of a bank and ticket vending machines at a train station as stated above.

Figure 1:
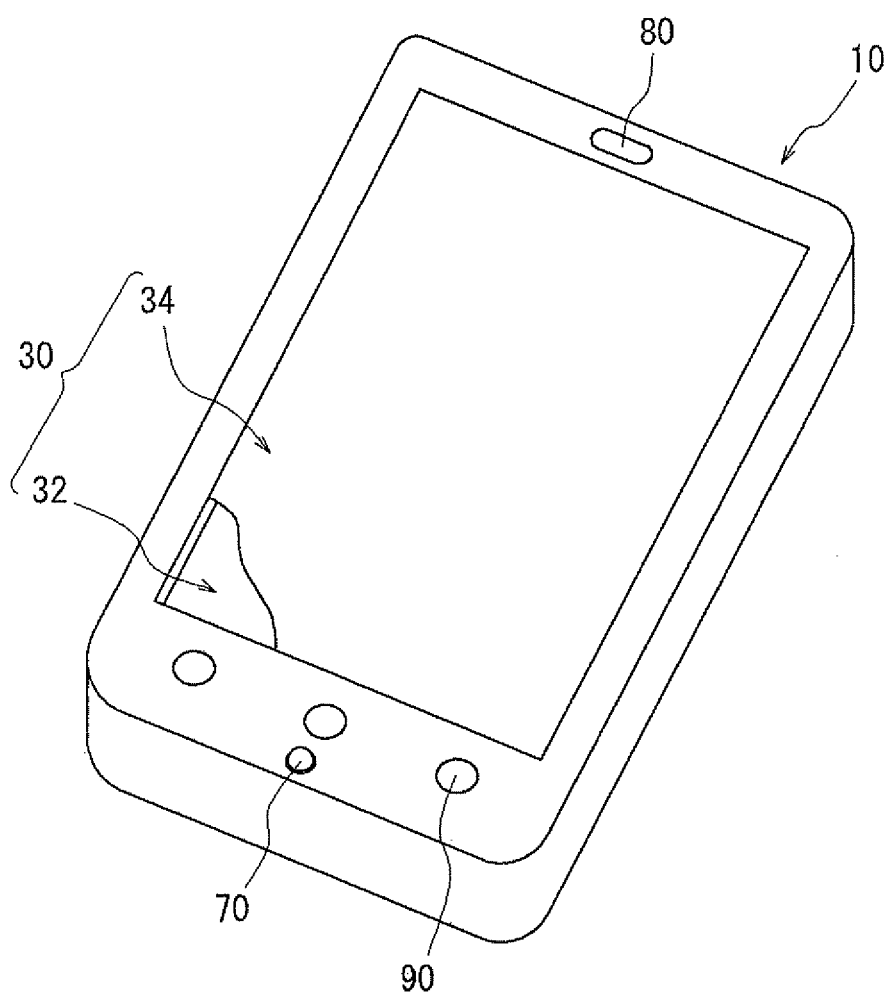
FIG. 1 is an external perspective view of a mobile phone having an input apparatus according to an embodiment of the present invention.

FIG. 1 is an external perspective view illustrating a schematic configuration of a mobile phone 10 having an input apparatus according to an embodiment of the present invention. The mobile phone 10 has a display unit 32, a part of which is displayed in the figure, on a front face of a terminal body, for displaying a variety of information and graphical images of keys and buttons on a liquid crystal display (LCD), an organic EL display or the like. The mobile phone 10 also has an input unit 34 constituted of a matrix switch or the like for receiving an input by a user with a finger or a stylus at a front face of the display unit 32. According to the present embodiment, a touch panel 30 includes the display unit 32 and the input unit 34. The mobile phone 10 further includes an audio input unit 70 constituted of a microphone or the like, an audio output unit 80 constituted of a speaker or the like, and a key input unit 90 constituted of at least one mechanical key.

Although the mobile phone 10 may additionally have a digital camera function unit, a One-seg broadcast tuner, a Near Field Communication unit such as an infrared communication function unit, various interfaces and the like according to necessary functions, figures and detailed descriptions thereof are omitted.

Figure 2:
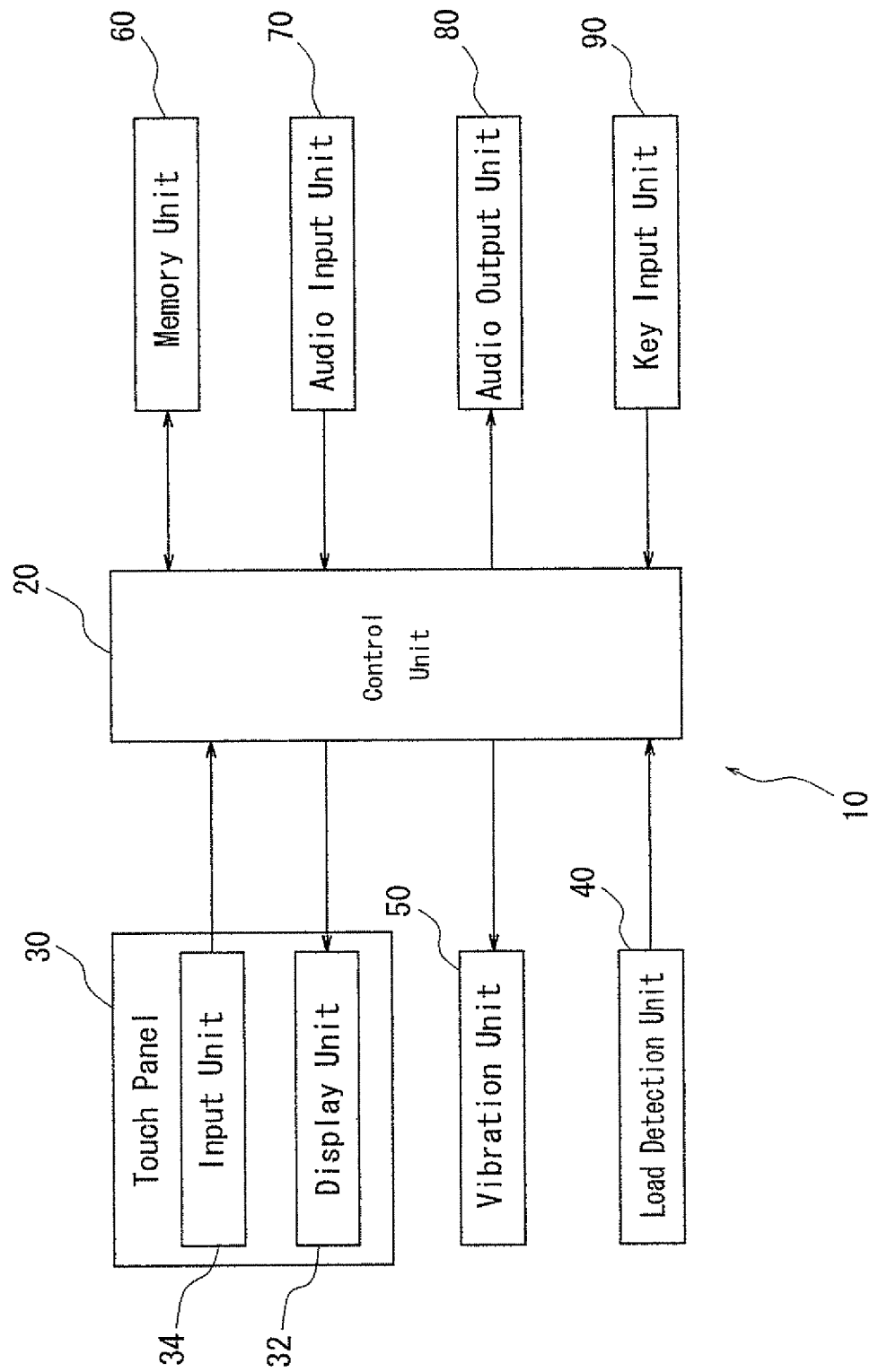
FIG. 2 is a functional block diagram illustrating an internal configuration of the mobile phone according to the embodiment.

FIG. 2 is a functional block diagram illustrating a schematic internal configuration of the mobile phone 10. As shown in FIG. 2, the mobile phone 10 has a control unit 20, a touch panel 30, a load detection unit 40, a vibration unit 50, a memory unit 60, the audio input unit 70, the audio output unit 80 and the key input unit 90. The control unit 20 controls and manages the entire mobile terminal 10 as well as each functional block of the mobile terminal 10. As stated above, the touch panel 30 has a structure that the input unit 34 for receiving input from a user is arranged overlapping the front face of the display unit 32. Thereby, the touch panel 30 receives an operation input by the user as well as displaying a variety of information such as a result of the input according to each application program (hereinafter, abbreviated to an "application").

The input unit 34 of the touch panel 30, upon detection of an input by a contact (pressure) of a user's finger or a stylus, outputs a signal corresponding to a position where such input is detected. The touch panel 30 is made as a known type such as, for example, resistance film type, capacitance type or the like. The display unit 32 performs display according to each application, as well as displaying a graphical image of user interface, composed of various keys and buttons for receiving operation inputs to the input unit 34 by the user in a predetermined display area. According to the present embodiment, the images of the various keys and buttons displayed on the display unit 32 for receiving operation inputs to the input unit 34 of the touch panel 30 by the user are referred to as "input objects".

The load detection unit 40 may be a strain gauge sensor, for example, and detects a pressure load on the touch panel 30 (or the input unit 34). The vibration unit 50 may be, for example, a piezoelectric element or an ultrasonic transducer and vibrates the touch panel 30. A constitutional relationship among the load detection unit 40, the vibration unit 50 and the touch panel 30 will be described below.

The memory unit 60 stores various applications and a variety of input information, as well as functioning as a work memory. In addition, the memory unit 60 also stores a plurality of templates including various input objects to be used according to each application.

The audio input unit 70 converts user's voice and the like into input signals and transmits them to the control unit 20. The audio output unit 80 converts voice signals transmitted from the control unit 20 into voice. The key input unit 90 transmits a signal corresponding to an operation input by the user to the control unit 20. Usages and functions of the various keys constituting the key input unit 90 are defined according to an application to be used.

The mobile phone 10 further includes various function units necessary for providing functions as a usual mobile phone such as an antenna and a wireless communication unit for transmitting and receiving a variety of information such as voice call and e-mail data to/from a base station via the internet, wireless communication and the like. However, since such function units have no particular distinction from known arts, descriptions thereof are omitted.

Next, the constitutional relationship among the load detection unit 40, the vibration unit 50 and the touch panel 30 is described.

FIG. 3 is a diagram illustrating an exemplary implementation structure of the touch panel 30, the load detection unit 40 and the vibration unit 50 of the mobile phone 10 shown in FIG. 2. FIG. 3(A) is a cross-sectional view of a main section, whereas FIG. 3(B) is a plane view of the main section.

The display unit 32 for displaying various input objects on the touch panel 30 is housed in a housing 12. In the input apparatus according to the present embodiment, the input unit 34 is supported on the display unit 32 via insulators 36 made of elastic members. In the input apparatus according to the present embodiment, the display unit 32 and the input unit 34 are rectangular in a planar view. Although the touch panel 30 is square in FIG. 3, it may be oblong in accordance with specifications of the mobile terminal mounting the touch panel 30. In the input apparatus, the input unit 34 is supported on the display unit 32 via the insulators 36 arranged at four corners outside a display area A of the display unit 32 indicated by virtual lines in FIG. 3(B).

In addition, in the input apparatus, the housing 12 is provided with an upper cover 14 for covering a surface area of the input unit 34 outside the display area of the display unit 32. Insulators 16 made of elastic members are arranged between the upper cover 14 and the input unit 34.

The input unit 34 has a surface, that is, a face for receiving input operations, formed of a transparent film, and a rear face formed of a glass. The input unit 34 may be designed such that the transparent film of the surface slightly bends (strains) in proportion to pressure when an operation face is pressed.

In addition, in the input apparatus according to the present embodiment, the strain gauge sensor for detecting the pressure load (pressure) applied on the input unit 34 is provided, adhered or the like, to the transparent film on the surface of the input unit 34 near each side covered by the upper cover 14. Moreover, in the input apparatus, the piezoelectric element or the ultrasound transducer for vibrating the input unit 34 is provided, adhered or the like, to the face of the glass on the rear side of the input unit 34 near each of two opposed sides. That is, in the input apparatus shown in FIG. 3, the load detection unit 40 and the vibration unit 50 shown in FIG. 2 include four strain gauge sensors and two vibrators, respectively. It is to be noted that the housing 12, the upper cover 14 and the insulator 16 shown in FIG. 3(A) are omitted in FIG. 3(B).

In the input apparatus according to the present embodiment, the control unit 20 monitors an input detected by the input unit 34 and a pressure load detected by the load detection unit 40. If the pressure input detected by the input unit 34 is an input to an input object displayed on the display unit 32 and the pressure load detected by the load detection unit 40 satisfies a predetermined standard for receiving an input, the control unit 20 receives such an input as a normal input. Hereinafter, this "standard for receiving an input" is referred to as a "load standard", simply. The load detection unit 40 detects the load from, for example, an average output value of the four strain gauge sensors.

Additionally, the vibration unit 50 drives, for example, two ultrasound transducers in phase. When there is a predetermined pressure input on the input unit 34, the control unit 20 controls the vibration unit 50 to generate vibration in order to transmit the vibration to an object, such as the user's finger or the stylus, pressing the input unit 34. With the vibration generated by the vibration unit 50 when the predetermined input is performed, the user can recognize that the pressure input by the user is received appropriately by the input apparatus.

Figure 4:
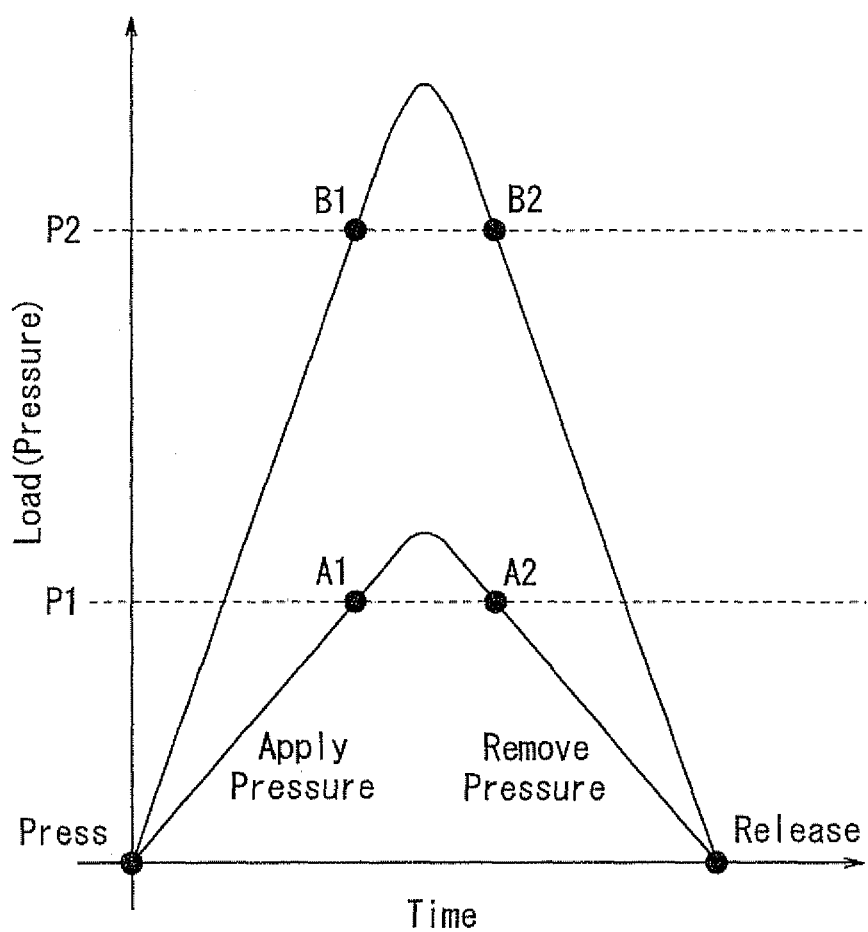
FIG. 4 is a graph schematically illustrating an exemplary chronological change in a load (pressure) detected by the load detection unit when a user presses an input unit of the touch panel.

Next, the load standard of an input object according to the present embodiment is described. FIG. 4 is a graph schematically illustrating an exemplary chronological change in a pressure load (pressure) detected by the load detection unit 40 when the user performs an operation input by pressing the input unit 34 of the touch panel 30. Generally, when performing operation to press (pressure input) the input unit 34 of the touch panel 30, the user continues to increase pressure on the input unit 34 (that is, the user presses the input unit 34 down) from when touching the input unit 34 until determining that the input is received. In addition, upon determining that the input is received, the user reduces the pressure on the input unit 34 (that is, the user releases a finger or the like from the input unit 34). Accordingly, as represented by a curved line shown in FIG. 4, the load detected by the load detection unit 40 is first increased upward and then reduced downward with time passing from the left side to the right side.

The following is a description of an initial setting preparing for input object load standard setting processing. In order to perform the input object load standard setting processing according to the present embodiment, a load standard P1 is set for determining that there is an input to the input unit 34 as a normal operation input to an input object displayed on the display unit 32. The load standard P1 is set by the control unit 20 based on a normal pressure at the normal operation input to the display unit 32 by the user. Based on this setting, if a pressure load exceeding the P1 (A1), as the normal pressure at the normal operation input by the user, is detected by the load detection unit 40, the control unit 20 determines that the input object displayed on the display unit 32 is pressed. In addition, if the load detection unit 40 detects that the load pressure on the input object being pressed drops under the P1 (A2) (after A1), the control unit 20 determines that the operation input to the input object being pressed is completed (confirmed).

The load standard P1 set as stated above prevents the input apparatus from determining a slight touch to the input unit 34 by the user as an input. Thereby, it is possible to avoid an unintended input by the user.

In addition, the load standard P1 set as stated above enables the user to perform a repetitive tapping by pressing the same spot (the same input object) on the input unit 34 multiple times continually, without releasing the finger from the input unit 34 each time. That is, even if the user's finger keeps touching the input unit 34, the user can make the input unit 34 recognize such an input as the repetitive tapping, by adjusting strength of pressure by the finger to increase and decrease across the load standard P1. Since this input method needs only small strokes of the user's finger, the user mastering this method may quickly and easily input with a smaller movement of the finger.

Next, according to the present embodiment, the control unit 20 sets a load standard P2 based on a pressure larger (heavier) than the normal pressure at the normal operation input to the input unit 34 by the user. According to the present embodiment, a pressure exceeding the load standard P2 set in this manner is received as an input to another input object adjacent to the input object with the load standard P1 described above. Accordingly, if a pressure load, exceeding the load standard P2 (B2) greater than the P1 on another input object adjacent to the input object with the load standard P1, is detected by the load detection unit 40, the control unit 20 determines that this adjacent input object is pressed. In addition, if the load detection unit 40 detects that the load pressure on the adjacent input object being pressed drops under the P2 (B2) (after B1), the control unit 20 determines that the operation input to the input object being pressed is completed (confirmed). That is, the control unit 20 controls such that the load standard (P2) for receiving a pressure input to another input object adjacent to the input object displayed on the display unit 32 is higher than the load standard P1 for receiving a pressure input to the input object.

Accordingly, even if the user presses another input object adjacent to the input object with the load standard P1 at a normal pressure (under P2) of the normal operation input, the control unit 20 does not receive this pressure input as an input to this adjacent input object. However, only if the user presses the adjacent input object at a pressure exceeding the P2 greater than the normal pressure (P1) at the normal operation input, the control unit 20 receives this pressure input as an input to this input object.

In the above description, the load standards (P1, P2) are used as "pressure load thresholds" to determine that "the load standard is satisfied" if it is exceeded, for example. Although a determination in this manner is applied to the following descriptions, there may also be other conditions to determine that "the load standard is satisfied". For example, it is possible to determine that the load standard is satisfied if the pressure load of a pressure input by the user to an input object "reaches" the above load standard. In addition, it is also possible to determine that the load standard is satisfied if the pressure load indicating the above load standard is "detected" by the load detection unit 40.

Figure 5:
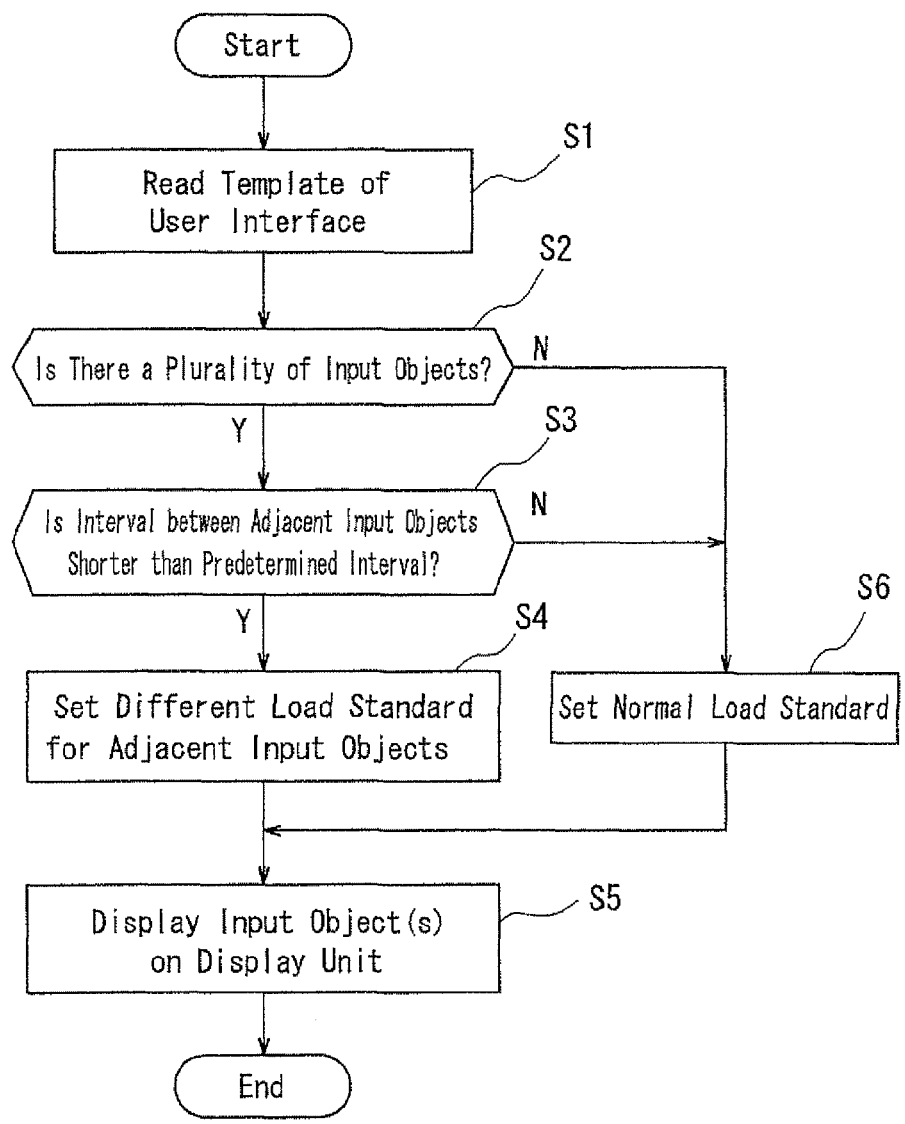
FIG. 5 is a flowchart illustrating the input object load standard setting processing according to the embodiment.

Next, the input object load standard setting processing according to the present embodiment is described with reference to a flowchart shown in FIG. 5. The input object load standard setting processing according to the present embodiment starts upon reception, by the control unit 20, of a request (command) to activate an application to display a user interface composed of input objects on the display unit 32 of the touch panel 30. First, upon reception of the command to activate the application to display the user interface, the control unit 20 reads a template corresponding to the request among templates of various user interfaces stored in the memory unit 60 (step S1).

After reading the template of the user interface, the control unit 20 determines whether there is a plurality of input objects included in the template (step S2). If there is a plurality of input objects included in the template, the control unit 20 next determines whether the specification needs to arrange adjacent input objects at intervals narrower than a predetermined interval (step S3). The predetermined interval will be described below. If there is a plurality of input objects included in the template and the adjacent input objects arranged at intervals narrower than the predetermined interval, the control unit 20 sets a load standard of each of the input objects (step S4) such that load standards (P1 and P2) for receiving pressure inputs to these input objects are different from each other (step S4).

Upon completion of setting the load standard of each of the input objects at step S4, the control unit 20 displays these input objects on the display unit 32 to receive an input by the user (step S5). If the number of input objects is not more than 1 at step S2, that is, if there is only one input object, the normal load standard (P1) is set for this input object (step S6), and then the control unit 20 shifts to step S5. Also, if a plurality of input objects is arranged at intervals wider than the predetermined interval at step S3, the normal load standard (P1) is set for all of these input objects (step S6), and then the control unit 20 shifts to step S5.

Thereby, if a plurality of input objects is arranged at adjacent positions, different load standards for receiving pressure inputs are set to the input objects, respectively. The predetermined interval stated above is an interval at which, if the input objects are arranged at intervals narrower than that, it is highly possible for the user to press an input object other than an intended input object by mistake. Here, the predetermined interval may be a distance from an end of one input object to an end of another input object or a distance from a center of one input object to a center of another input object. The following is a detailed description of a result of the above processing with reference to a typical embodiment.

Figure 6:
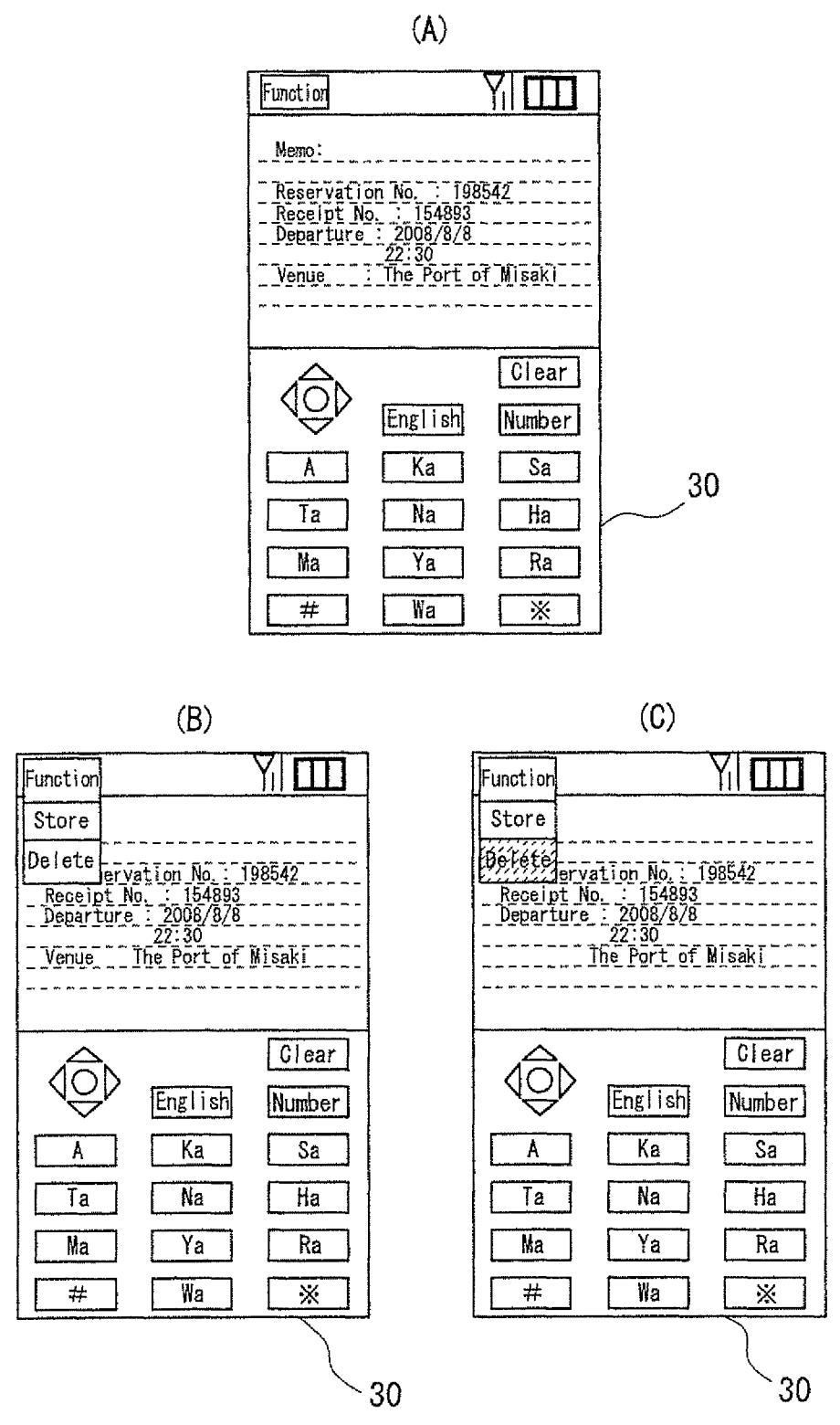

The following is a description of a case in which a user memo writing application is activated as shown in FIG. 6(A), for example. This application displays character input objects in an approximately lower half portion of the display unit 32 of the touch panel 30 in order to receive user's inputs to the input unit 34. This user memo writing application displays the character input objects arranged at predetermined intervals or wider. In this example, accordingly, there is a less probability for the user to press an input object other than an intended input object by mistake. Therefore, the control unit 20 sets the normal load standard (P1) for each of these input objects. Since it is a conventional art known as a "multi-tap input method" to input each character using a numerical keypad associated with kana characters by transiting kana characters corresponding to each key according to the number of input times of the key in order of "Hiragana", a description thereof is omitted.

When the user stores a memo in the memory unit (memory) 60 after completing inputs of the characters as shown in FIG. 6(A), the control unit 20, in response to a pressure input to an input object "Function" displayed in the upper left portion of the display unit 32 of the touch panel 30, displays a so-called pull-down menu as shown in FIG. 6(B). The pull-down menu of a "Function" includes input objects "Store" and "Delete". If these two input objects are arranged at an interval narrower than the predetermined interval (for example, adjacent to each other), different load standards for receiving pressure inputs are set for the input objects "Store" and "Delete" by the load standard setting processing stated above. In this case, if one of the adjacent input objects, is related to an unrecoverable (important) operation such as the input object "Delete" in this case, the load standard P2, which is 3 N (Newton), for example, is set for this input object. Additionally, the load standard P1, which is 1 N, for example, is set for the input object, such as the input object "Store", adjacent to the input object with the load standard P2.

As stated above, it is possible, by setting different load standards for the input objects, to prevent a disadvantage caused if the user presses the input object "Delete" by mistake in spite of an intention to press the input object "Store". That is, even if there is an input with a normal pressure (under P2) at a normal operation input to the input object "Delete", the input apparatus according to the present embodiment does not receive this as an input. In order to input to the input object "Delete", it is necessary for the user to purposely perform an operation input with a pressure load exceeding the load standard (P2) greater than the load standard (P1) at the normal pressure of the normal operation input.

In addition, when the touch panel 30 has a function to simultaneously receive input to a plurality of input objects, the same processing as stated above may be also performed. That is, for example, it may happen that the user presses both of the input objects "Store" and "Delete" simultaneously by mistake (or because a contact area of the finger pressing the input unit 34 protrudes from the input object "Store") in spite of an intention to press only the input object "Store". In this case also, the input to the input object "Delete" at a normal (under P2) pressure of a normal operation input is not received. A method to handle a case that, opposite to the case described above, the user presses the input object "Store" by mistake, in spite of an intention to press the input object "Delete", will be described below.

According to the present embodiment as stated above, a load greater (exceeding the P2) than the pressure load based on the normal operation input is set for an input object adjacent to an input object for receiving an input by a normal pressure based on the normal operation input (exceeding the P1). An input by a pressure load greater (heavier) than that at the normal operation input differs from various inputs (for example, holding down and double pressing such as double click) regarded as normal input methods. Accordingly, since the various inputs, regarded as the normal input methods, to the input object with the load standard P2 is not received, an incorrect input unintended by the user is not received as a valid input. That is, an input by an unintended operation by the user is avoided.

If input objects are arranged at adjacent positions in the processing according to the present embodiment, it is preferred to indicate, for the user, that the input object with the load standard P2 needs to be pressed at a pressure heavier than that of the normal operation input. As the input object of "Delete" key shown in FIG. 6(C), for example, the input object to which a user needs to input with a strong pressure is displayed in a color different from other input objects on the display unit 32. Thereby, it is possible to emphasize that the input object in the different color is the input object with the load standard P2. In addition, it is also possible to display such an input object, together with a note such as "Touch 'Delete' key strongly", for example, at a predetermined position on the display unit 32.

Figure 7:
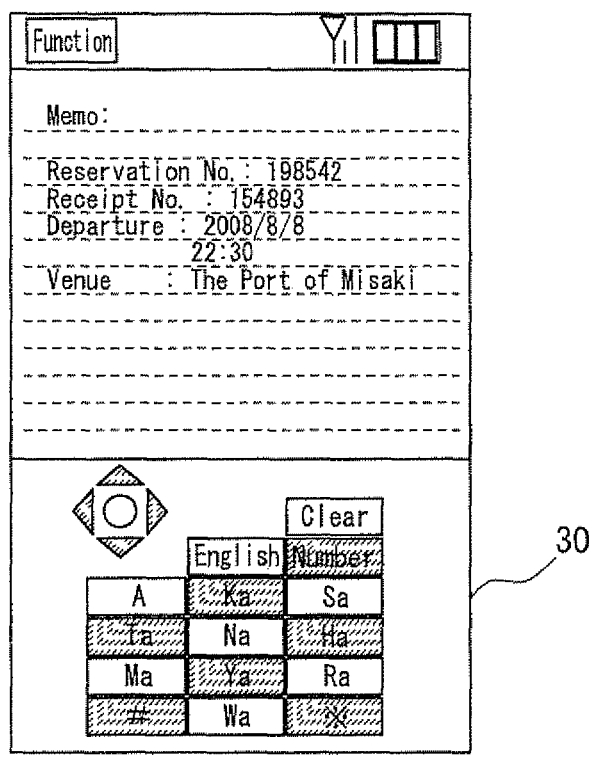
FIG. 7 shows another exemplary display on the display unit based on the input object load standard setting processing according to the embodiment.

Now, another embodiment is described. On a display panel of the user memo writing application shown in FIG. 7, although an arrangement of the character input objects displayed on the display unit 32 of the touch panel 30 is similar to that shown in FIG. 6, a larger area is provided to display a result (memo) of user's inputs. Accordingly, an area to arrange the character input objects for receiving pressure inputs by the user is relatively small. In this case, as shown in FIG. 7, each of the input objects is reduced in size and the intervals between the input objects are narrowed. If the intervals between the input objects are narrower than a predetermined interval, the control unit 20 sets different load standards for the adjacent input objects based on the input object load standard setting processing according to the present embodiment.

In the load standard setting processing according to the present embodiment, the input objects with different load standards are arranged alternately, as shown in FIG. 7, for example. In an example shown in FIG. 7, in order to indicate that the adjacent input objects have different load standards, the input objects to which a user needs to input with a stronger pressure, are displayed in a different color. That is, it is indicated in FIG. 7 that the load standard (P2) greater than the load standard (P1) at the normal input operation is set for the input objects in a dark color (hatched with broken lines). It is also indicated that the normal load standard (P1) is set for the input objects in a normal (white) color, in contrast.

As a result of setting of the load standards as described above, the input object, for which the load standard (P2) greater than the normal load standard (P1) is set, is arranged adjacent to the input object, for which the normal load standard (P1) is set, on the input unit 34 of the touch panel 30. That is, the input objects for which the normal load standard (P1) is set and the input objects for which the load standard (P2) greater than the normal load standard (P1) is set are arranged alternately. Hence, it is possible for the user to input to these input objects distinctively even if multiple input objects are closely arranged at adjacent positions.

As a result of setting of the load standards as described above, it is possible to handle a case that the user presses the input object with the high load standard (P2) at a normal pressure by mistake, in spite of an intention to press the input object with the low load standard (P1). However, this setting alone cannot handle a case that the user presses strongly the input object with the low load standard (P1) by mistake, in spite of an intention to press the input object with the high load standard (P2). That is, in this case, the user presses the input unit 34 with a high pressure, which exceeds the low load standard (P1) as well, as intending to press the input object with the high load standard (P2). Therefore, the control unit 20 receives the input to the input object with the low load standard (P1) against the user's intention.

According to the present embodiment, in order to handle such a disadvantage, in the pressure input reception processing of an input object carried out after arrangement of the input objects by the input object load standard setting processing described with reference to FIG. 5, an input is canceled in certain cases. The following is a description of a series of processing carried out in such cases.

First, with reference to a flowchart shown in FIG. 8, it is described about a summary of the pressure input reception processing of an input object carried out after arrangement of the input objects by the input object load standard setting processing described with reference to FIG. 5. This processing starts upon reception of an input to the input unit 34 by the user after activating the user memo writing application or the like, for example, and the input objects are displayed at adjacent positions on the display unit 32 by the processing described with reference to FIG. 5.

Upon start of the pressure input reception processing of an input object according to the present embodiment, the control unit 20 determines whether an input by the user's finger, the stylus or the like (hereinafter, abbreviated as a "user's input") to the input unit 34 corresponding to an input object on the touch panel 30 is detected (step S11).

If the user's input to the input unit 34 corresponding to the input object is detected at step S 11, the control unit 20 determines whether a position on the display unit 32 where the input is detected corresponds to an input object for which the load standard (P2) greater (higher) than the normal load standard (P1) is set (step S12). If the input position corresponds to the input object with the load standard (P2) greater than the normal load standard (P1) (Yes of step S12), the control unit 20 performs high load input reception processing (step S13).

In contrast, at step S12, if the input position does not correspond to the input object for which the load standard P2 is set (No of step S12), the control unit 20 performs low load input reception processing (step S14). Here, the processing shifts from step S12 to step S14 if the input object to which a user's input is detected is an input object for which the load standard P1 is set.

Figure 8:
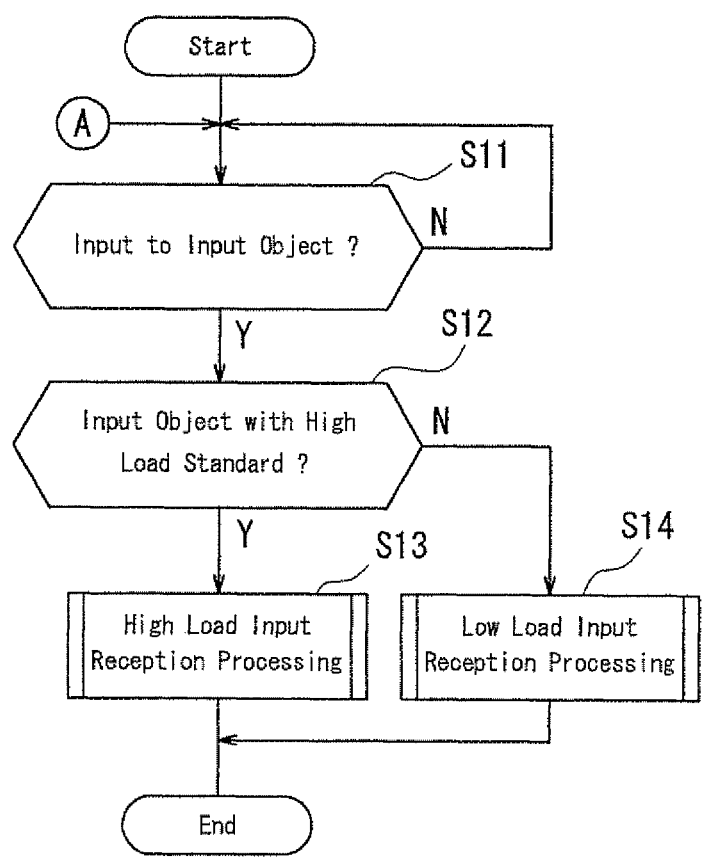
FIG. 8 is a flowchart illustrating the pressure input reception processing of an input object according to the embodiment.
Figure 9:
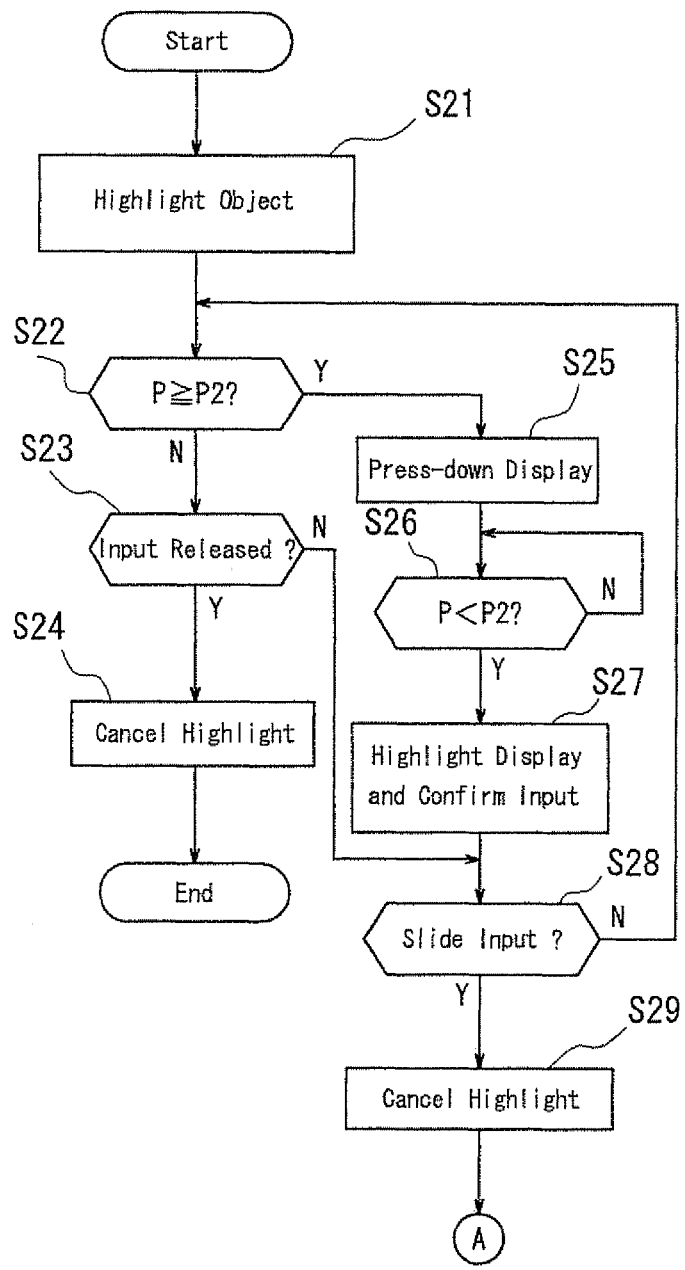
FIG. 9 is a flowchart illustrating the high load input reception processing according to the embodiment.

Next, with reference to a flowchart in FIG. 9, it is described in detail about the high load input reception processing at step S13 shown in FIG. 8. The high load input reception processing is carried out if an input position of a pressure input to the input unit 34 by the user corresponds to an input object with the load standard (P2) greater than the normal load standard (P1), that is, the input object with the high load standard (Yes of step S12).

Upon start of the high load input reception processing, the control unit 20 first performs a highlight display of this input object (step S21). The highlight display is an emphasizing display to inform the user that a finger or the like touches the input object. For example, if a user's input to the input object "Delete" as shown in FIG. 10(A) is detected, the control unit 20 highlights the input object as shown in FIG. 10(B). Thereby, the user can visually recognize that the input by the finger or the like to the input unit 34 is appropriately detected by the input apparatus. It is to be noted that the highlight display indicates simply that the user's finger or the like is touching the input unit 34 and, hence, it is not yet determined at this point that the input is received (that is, the key is pressed).

Next, the control unit 20 determines whether the pressure load P detected by the load detection unit 40 exceeds the load standard P2 (step S22). As to the input object with the load standard P2, the control unit 20 does not regard that an input is received, unless there is an input with a pressure load exceeding the load standard P2. Accordingly, if the pressure load P exceeding the load standard P2 is not detected by the load detection unit 40 at step S22, the control unit 20 determines whether the user's input to the input unit 34 is released (step S23).

If this input is not released (that is, the user's finger or the like is not released from the input unit 34) at step S23, the control unit 20 shifts to step S28. The control unit 20, at step S28, determines whether a so-called slide input by which a position of a pressure input detected by the input unit 34 is moved is detected. Here, the slide input is performed by the user moving a finger or the like while pressing the finger or the like to the input unit 34 such that an input position is moved from an input object originally pressed to another input object.

If the slide input is not detected at step S28, the control unit 20 returns to step S22 to monitor the pressure load P detected by the load detection unit 40. If it is determined at step S23 that the user's input to the input unit 34 is released, the control unit 20 regards that there is no input to the input object touched by the user, cancels the highlight display (step S24) and then ends the processing.

Cancellation of the highlight display at step S24 informs the user that the input by the user's finger or the like to the input unit 34 at a position corresponding to an input object is no longer detected. For example, the control unit 20 changes the highlight display of the input object on the display unit 32 in response to a detection of a user's input back to a display as shown in FIG. 10(A). Thereby, the user can visually recognize that the input apparatus appropriately recognizes that the user's finger or the like, which was touching the input unit 34, is released therefrom.

In contrast, if the pressure load P exceeding the load standard value P2 (B1 shown in FIG. 4) is detected by the load detection unit 40 at step S22, the control unit 20 displays that the input object to which the input is detected is pressed down (step S25). This press-down display is a display of the display unit 32 to indicate that the input object, on which the input is being detected, is pressed as a key. That is, the control unit 20 changes the highlight display of the input object as shown in FIG. 10(B) to the display indicating that the input object is being pressed as shown in FIG. 10(C). Thereby, the user can visually recognize that the pressure input P exceeds the load standard P2 and that the pressure input by the user's finger or the like touching the input unit 34 is appropriately received as the pressure input to the input object by the input apparatus.

After step S25, the control unit 20 determines whether the pressure of the user's input to the input unit 34 is reduced and the pressure load P detected by the load detection unit 40 becomes equal to or lower than the load standard P2 (B2 shown in FIG. 4) (step S26). If it is determined at step S26 that the pressure load P becomes equal to or lower than the load standard P2, the control unit 20 accepts that the operation input to the input object with the load standard P2, currently receiving the input, is confirmed (step S27). That is, in the input processing according to the present embodiment, if compared to a mechanical key, reception of an input to the key is confirmed not when the key is pressed but when the key is released.

At step S27, in addition, the control unit 20 returns the display of the display unit 32 to the highlight display in order to indicate that the pressure load to the input object to which the input is detected becomes equal to or lower than the P2. That is, for example, the control unit 20 returns the display indicating that the input object is pressed as shown in FIG. 10(C) to the highlight display of the input object as shown in FIG. 10(B). Thereby, the user can visually recognize that the pressure input to the input object is confirmed as an input and also that the input apparatus appropriately recognizes that the pressure, on the input object is reduced.

After step S27, the control unit 20 determines whether the slide input as described above is detected by the input unit 34 (step S28). If the slide input is detected by the input unit 34 at step S28, the control unit 20 returns to step S22 to continue to monitor the pressure load P detected by the load detection unit 40. In this case, the control unit 20 subsequently waits for the user's input to the input unit 34 to be released (step S23) or waits for another pressure input (that is, a continuous pressure input) to the input object to which the input is being detected to be detected.

In contrast, if the slide input is detected at step S28 while the pressure load on the input unit 34 does not fall to zero, the control unit 20 shifts to step S29. At step S29, the control unit 20 cancels the press-down display of the input object to which an original pressure input is detected (before the slide input), and then returns to step S11 in FIG. 8 to continue the processing.

After the slide input (step S28), through step S11, the control unit 20, at step S12, determines whether the input position, by the slide input, is moved to the input object with the low load standard (P1) or the input object with the high load standard (P2). That is, according to the present embodiment, after detection of the pressure on the input object with the load standard P2, the user can carry over an input not exceeding the load standard P2 or an input confirmed as an input after exceeding the load standard P2, to an input to another input object without releasing the pressure.

Accordingly, the user can change an intended input object without releasing the finger from the input unit 34 of the touch panel 30. Hence, by utilizing the slide input, the user can change the input object even after once touching the input unit 34 if the input is not received (confirmed) yet. Also, since the slide input enables the user to input continuously only by adjusting the strength of the pressure load while touching the input unit 34, the user having mastered this input method can input quickly.

A curved line passing B1 to B2 shown in FIG. 4 is an exemplary chronological change in the pressure load on the input unit 34 detected by the load detection unit 40 when a reception of the input is confirmed by the high load input reception processing stated above, after the pressure input to the input unit 34 by the user is detected. As shown in FIG. 4, an input to the input object with the load standard P2 is received at a point (B1) when the pressure load exceeds the pressure standard P2 and confirmed at a point (B2) when the pressure load falls down equal to or lower than the pressure standard P2.

Figure 11:
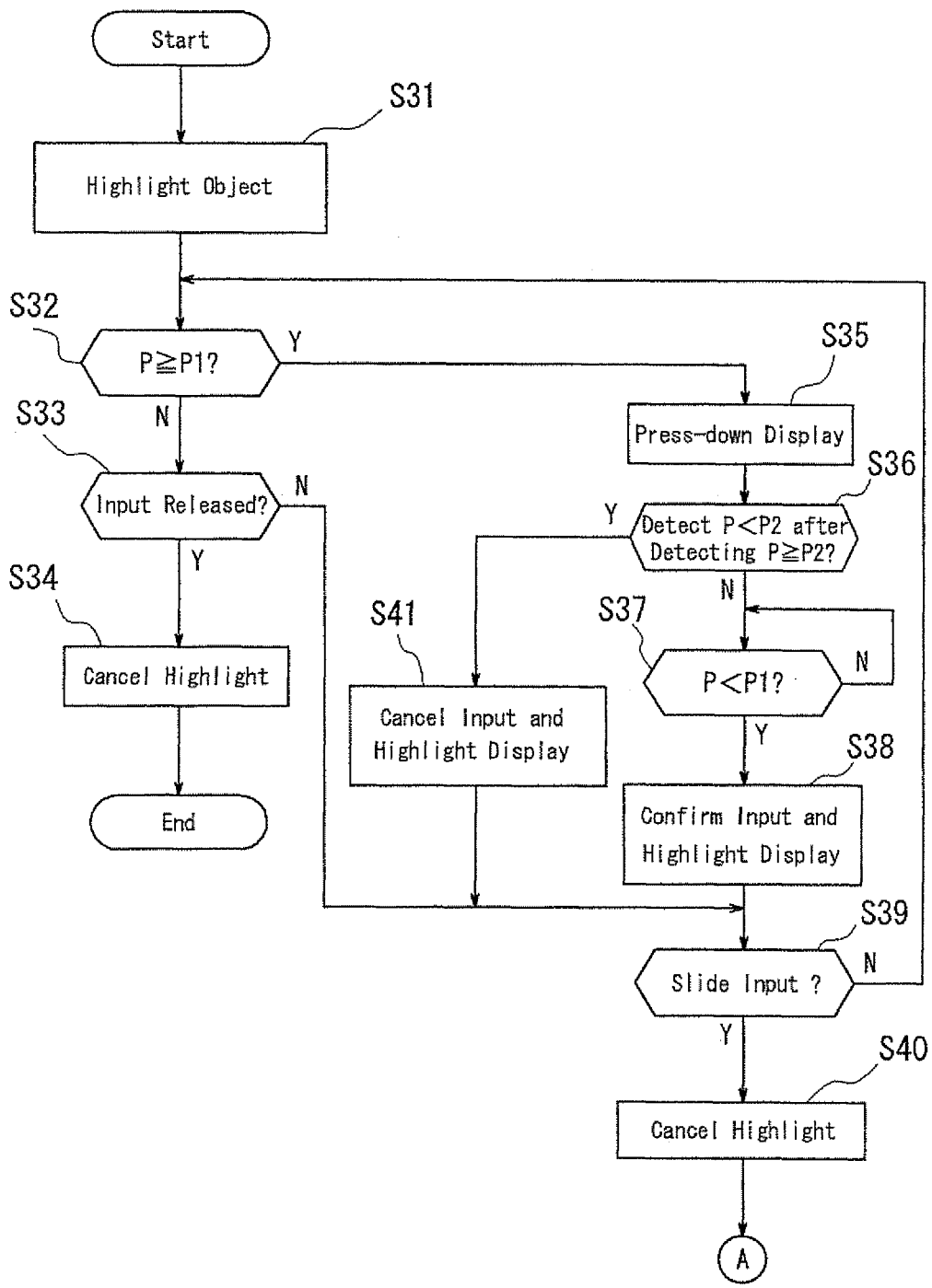
FIG. 11 is a flowchart illustrating the low load input reception processing according to the embodiment.

Next, with reference to a flowchart in FIG. 11, it is described in detail about the low load input reception processing at step S14 shown in FIG. 8. The low load input reception processing is carried out if an input position of a pressure input to the input unit 34 by the user corresponds to an input object for which the normal load standard (P1), that is, the low load standard is set (No of step S12).

Upon start of the low load input reception processing, the control unit 20 first highlights the input object (step S31). In this case, the input object is highlighted in the same manner as the highlight display at step S21.

Next, the control unit 20 determines whether the pressure load P detected by the load detection unit 40 exceeds the load standard value P1 (step S32). Similarly to a normal operation input to the input object with the load standard P1, the control unit 20 receives an input if the load pressure exceeds the load standard P1. In contrast, if the load pressure P exceeding the load standard P1 is not detected by the load detection unit 40 at step S32, the control unit 20 determines whether the user's input to the input unit 34 is released (step S33).

If it is determined at step S33 that the input is not released (that is, the user's finger or the like is not released from the input unit 34), the control unit 20 shifts to step S39 to determine whether the slide input is detected. If it is determined at step S39 that the slide input is not detected, the control unit 20 returns to step S32 to monitor the pressure load P detected by the load detection unit 40. If it is determined at step S33 that the user's input to the input unit 34 is released, the control unit 20 regards that there is no input to the input object touched by the user, cancels the highlight display (step S34) and then ends the processing.

In contrast, if the pressure load P exceeding the load standard P1 (A1 shown in FIG. 4) is detected by the load detection unit 40 at step S32, the control unit 20 displays the press-down display of the input object to which the input is detected (step S35). The press-down display is to change the display of the display unit 32 to indicate that the input object to which the input is being detected is pressed as the key. That is, the control unit 20 changes the highlight display of the input object as shown in FIG. 10(B) to the display indicating that the input object is being pressed as shown in FIG. 10(C). Thereby, the user can visually recognize that the pressure load P exceeds the load standard P1 and that the input apparatus appropriately receives the pressure input by the user's finger or the like touching the input unit 34 as a pressure input to the input object.

In the low load input reception processing, the control unit 20, after step S35, determines whether the pressure load P detected by the load detection unit 40 falls down equal to or lower than the load standard P2 after once exceeding the P2 (step S36). Here, if the pressure load P falls down equal to or lower than the load standard P2 after once exceeding the P2, the pressure input for an input object with the high load standard (P2) is received to the input object with the low load standard (P1) and confirmed. In this case, it is considered that the user presses the input object with the load standard P1 by mistake, in spite of the intention to press an input object with the load standard P2. Processing in this case will be described below.

At step S36 after step S35, if the pressure load P<P2 after detection of the pressure load P≥P2 is not detected, that is, if it is considered that the user inputs correctly according to the user's intention, the control unit 20 shifts to step S37. At step S37, the control unit 20 determines whether the input pressure to the input unit 34 by the user is reduced and the pressure load P detected by the load detection unit 40 becomes equal to or lower than the load standard P1 (A2 shown in FIG. 4). If it is determined at step S37 that the pressure load P becomes equal to or lower than the load standard P1, the control unit 20 accepts that the operation input to the input object with the load standard P1 currently receiving the input is confirmed (step S38).

At step S38, additionally, the control unit 20 returns the display of the display unit 32 to the highlight display in order to indicate that the pressure load on the input object to which the input is detected becomes equal to or lower than the P1. That is, for example, the control unit 20 changes the display indicating that the input object is pressed as shown in FIG. 10(C) back to the highlight display of the input object as shown in FIG. 10(B). Thereby, the user can visually recognize that the pressure input to the input object is confirmed as an input and also that the input apparatus appropriately recognizes that the pressure on the input object is reduced.

After step S38, the control unit 20 determines whether the slide input to the input unit 34 is detected (step S39). If it is determined at step S39 that the slide input is not detected by the input unit 34, the control unit 20 returns to step S22 to continue to monitor the pressure load P detected by the load detection unit 40. In this case, the control unit 20 subsequently waits for the input to the input unit 34 by the user to be released (step S33) or waits for another input (that is, a continuous pressure input) to the input object to which the input is being detected to be detected. However, if the slide input is detected at step S39 while the pressure load to the input unit 34 does not fall to zero, the control unit 20 shifts to step S40. At step S40, after canceling the press-down display of the input object to which the pressure input is originally detected (before the slide input), the control unit 20 returns to S11 in FIG. 8 to continue the processing.

After the slide input (step S39), if the control unit 20 shifts to step S12 via step S11, processing the same as the high load input reception processing described above is carried out. That is, according to the present embodiment, after detection of a pressure on the input object with the load standard P1, the user can carry over the input not exceeding the load standard P1 or the input confirmed as an input after exceeding the load standard P1 to an input to another input object, without releasing the pressure.

A curved line passing A1 and A2 shown in FIG. 4 is an exemplary chronological change in the pressure load to the input unit 34 detected by the load detection unit 40 when the pressure input to the input unit 34 by the user is detected and the reception of the input is confirmed by the low load input reception processing described above. As shown in FIG. 4, the input to the input object with the load standard P1 is received at a point (A1) when the pressure load exceeds the pressure standard P1 and confirmed at a point (A2) when the pressure load falls down equal to or lower than the load standard P1.

In contrast, if it is determined at step S36 that the pressure load P detected by the load detection unit 40 falls down equal to or lower than the load standard P2 after once exceeding the P2, the control unit 20 shifts to step S41. The control unit 20 confirms a reception of the operation input to the input object with the load standard P1 to which the input is detected, if the pressure load P detected by the load detection unit 40 falls down equal to or lower than the P1 (A2) after once exceeding the load standard P1 (A1). However, when the control unit 20 shifts from step S36 to step S41, the pressure input for an input object with the load standard P2 is received and confirmed, even though the pressure input with a pressure load exceeding the P1 can be performed to the input object with the load standard P1. In this case, it is considered that the user presses the input object with the load standard P1 by mistake, in spite of the intention to press an input object with the load standard P2.

At step S41, accordingly, if the pressure load exceeding the P2 is detected on the input object with the load standard P1, the control unit 20, at a point when it is subsequently detected that the pressure load falls down equal to or lower than the P2, cancels the pressure input to this input object with the load standard P1. At step S41, in addition, in order to indicate that the pressure input to the input object with the load standard P1 receiving the input is cancelled, the control unit 20 returns the display indicating that the input object is pressed to the highlight display. After step S41, the control unit 20, in the same manner as the above processing after step S38, continues the processing to determine whether the slide input to the input unit 34 is detected (step S39).

As stated above, the processing from step S36 to step S41 in the low load input reception processing can handle a case that the user presses the input object with the load standard P1 by mistake, in spite of the intention to press the input object with the load standard P2.

Figure 12:
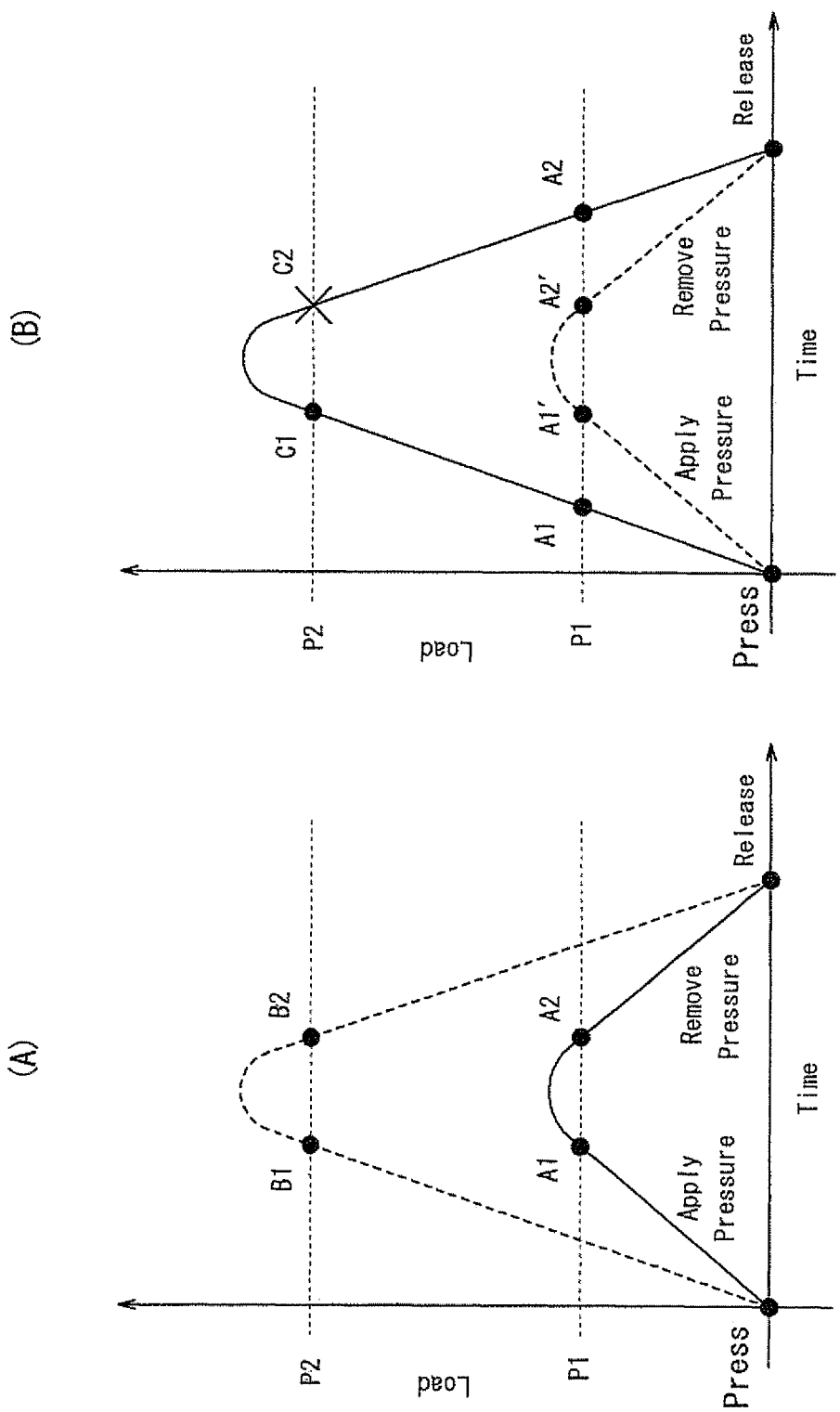
FIG. 12 shows graphs schematically illustrating exemplary chronological changes in the loads (pressures) detected by the load detection unit in the pressure input reception processing of an input object.

The following is a description of a method to handle a user's input to an incorrect input object against a user's intention by the pressure input reception processing of an input object according to the present embodiment, with reference to FIG. 12.

First, as to the input object with the high load standard (P2), if the pressure load falls down equal to or lower than the P2 (B2) after once exceeding the high load standard P2 (B1) as shown by a curved dotted line in FIG. 12(A), a reception of the operation input is confirmed. Accordingly, even if the user presses the input object with the load standard P2 at a normal pressure by mistake in spite of an intention to press the input object with the load standard P1, this input is not received. In this case, the pressure input by the user, like the pressure of the normal operation, exceeds the low load standard P1 (A1) and subsequently falls down equal to or lower than the P1 (A2), as shown by a curved solid line in FIG. 12(A). Thereby, an input unintended by the user is avoided.

Next, as to the input object with the low load standard (P1), if the pressure load falls down equal to or lower than P1 (A2') after once exceeding the low load standard P1 (A1') as shown by a curved dotted line in FIG. 12(B), a reception of the operation input is confirmed. However, if the user presses strongly the input object with the load standard P1 by mistake in spite of the intention to press an input object with the load standard P2, the pressure load exceeds the low load standard P1 (A1) as shown by a curved solid line in FIG. 12(B). At this point, although it is determined that the input object with the load standard P1 is pressed, a reception of the input is not confirmed yet. Accordingly, when the pressure load subsequently falls down to be equal to or lower than P2 (C2) after once exceeding the load standard P2 (C1), the reception of the input to the input object with the load standard P1 determined as being pressed is canceled. Therefore, if the user presses strongly the input object with the load standard P1 by mistake, in spite of the intention to press an input object with the load standard P2, it is regarded that there is not input to the input object with the load standard P1. Accordingly, in this case either, an input unintended by the user is not received.

The following is a description of a method for the user to simply repress a correct input object with the load standard P2, if the user presses strongly the input object with the load standard P1 by mistake, in spite of the intention to press the input object with the load standard P2.

Figure 13:
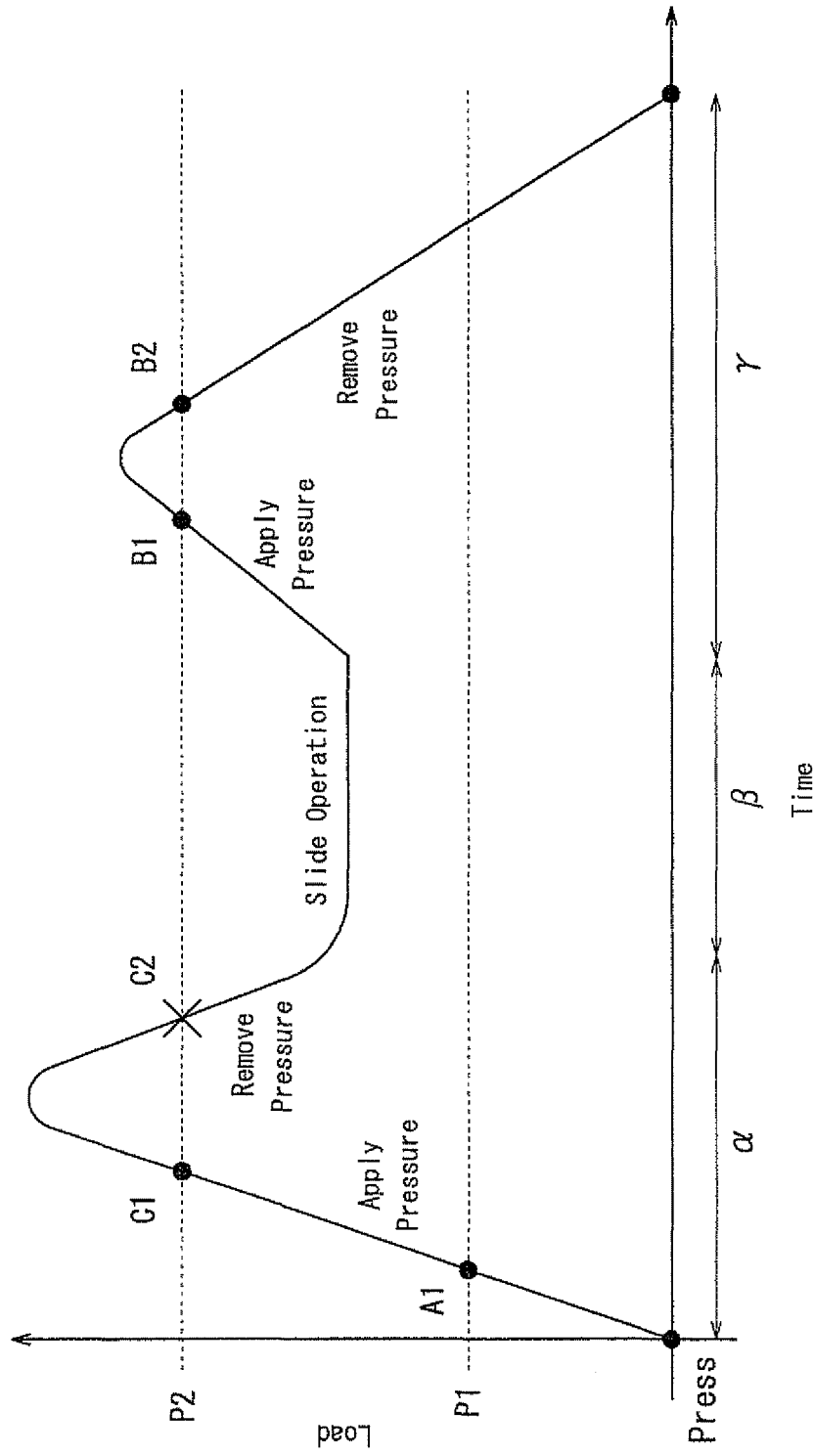
FIG. 13 is a graph schematically illustrating an exemplary chronological change in the load (pressure) of an input including a slide input detected by the load detection unit in the pressure input reception processing of an input object.

If the user presses strongly the input object with the load standard P1 in spite of the intention to press the input object with the load standard P2, the pressure load exceeds the low load standard P1 (A1), as shown by a curved solid line in FIG. 13. Then, after the pressure load exceeds the load standard P2 (C1) or at a point when the pressure load subsequently falls down equal to or lower than the P2 (C2), the control unit 20 informs the user that reception of the input to the input object is cancelled. In particular, the control unit 20 may control the audio output unit 80 to generate a sound (beep sound or the like) indicating the cancellation of the input or drive the vibration unit 50 to generate a vibration indicating the cancellation of the input. Thereby, the user can recognize that the pressure input by the user is not performed appropriately and thus is canceled. Those operations are shown in a range of α on a time axis in FIG. 13.

Subsequently, when recognizing the cancellation of the input, the user may carry over a pressure input to the input unit 34 to an intended input object with the load standard P2, by moving the pressure input without releasing it as the slide input described above. This operation is shown in a range of β on the time axis in FIG. 13. After moving the pressure input to the intended input object with load standard P2 by the slide input, the user may perform the pressure input at the pressure load exceeding the load standard P2 to the input object with the load standard P2. This operation is shown in a range of γ on the time axis in FIG. 13. Thereby, the user can easily correct the first incorrect input and input to the correct input object.

It is to be understood that the present invention is not limited to the embodiment set forth above but may be modified or varied in a multiple manner. For example, although it is assumed in the above embodiment to preset the load standards P1, P2 of the input objects and the predetermined interval, it is desired that the user can change or adjust them as necessary. Thereby, it is possible to appropriately adjust them afterward if the user feels uncomfortable with them during operations.

In the above embodiment, in order to simplify algorithm for determining an input, with regard to both of the input object with the load standard P1 and the input object with the load standard P2, reception of an input is confirmed not at a point exceeding the corresponding load standard but at a point falling down equal to or lower than the load standard. However, according to the present invention, it is also possible that an input to the input object with the load standard P1 is confirmed not at the point exceeding the load standard P1 but at the point falling down equal to or lower than the load standard P1 and that the input is cancelled at a point exceeding the load standard P2. That is, it is possible that the reception of the input to the input object with the load standard P1 is confirmed if the pressure load falls down equal to or less than the P1 after once exceeding it and cancelled if the pressure load subsequently exceeds the P2 as well after exceeding the P1.

Additionally, in the above embodiment, if the input objects are arranged at intervals narrower than the predetermined interval, different load standards are set to the input objects, in order to prevent an incorrect operation by the user. However, if each input object has a wide input reception area, there is a less probability for the user to perform an incorrect input, even if the adjacent input objects are arranged without any interval. Therefore, in such a case, if the input reception area of each of the input objects is larger than a predetermined size, it is not necessary to set different load standards for them. In addition, based on the fact that there is the less probability for the user to perform an incorrect input if the input reception area of each of the input objects is large, it is possible to change the predetermined interval, which is a standard for a determination whether to set different load standards, in accordance with the size of the input reception area of the input object. That is, in a case that the predetermined interval is set to 1 cm, the same load standard may be set if the input reception areas of the input objects are large (that is, if the input objects are large) and also the intervals between the input objects are wider than 0.1 cm, for example, whereas the different load standards may be set if the input reception areas are small and also the intervals are narrower than 2 cm, for example.

Although a case using two load standards P1 and P2 is employed as the simplest example in the above embodiment, it is possible to use three or more load standards.

In addition, according to the above embodiment, when the reception of the input to the input object is canceled, the vibration unit 50 vibrates to inform the user accordingly. Although it is not essential to notify the user with vibration in the present invention, vibration of the vibration unit 50 in response to the above various inputs, in addition to cancellation of the reception of the input, promises enhancement of usability.

Figure 14:
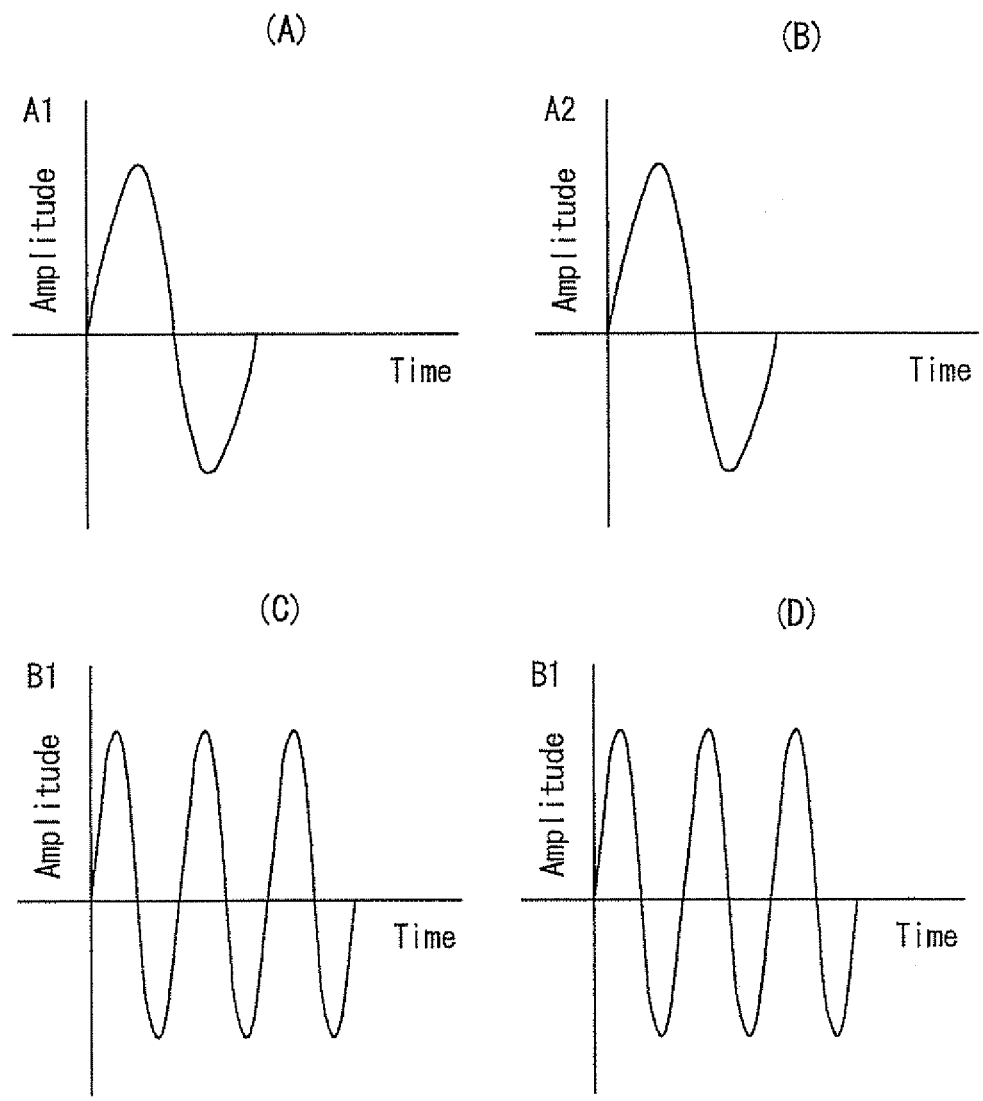
FIG. 14 shows diagrams illustrating exemplary waveforms of vibrations generated by the vibration unit of the mobile phone according to the embodiment.

For example, upon detection of a pressure load exceeding the P1 (A1) shown in FIG. 4 on the input object with the load standard P1 by the load detection unit 40, the control unit 20 controls the vibration unit 50 to generate vibration in a waveform shown in FIG. 14(A). Then, upon detection of a pressure load equal to or lower than the P1 (A2) shown in FIG. 4 on this input object by the load detection unit 40, the control unit 20 controls the vibration unit 50 to generate vibration in a waveform shown in FIG. 14(B). Moreover, upon detection of a pressure load exceeding the P2 (B1) shown in FIG. 4 on the input object with the load standard P2 by the load detection unit 40, the control unit 20 controls the vibration unit 50 to generate vibration in a waveform shown in FIG. 14(C). Then, upon detection of a pressure load equal to or lower than the P2 (B2) shown in FIG. 4 on this input object by the load detection unit 40, the control unit 20 controls the vibration unit 50 to generate vibration in a waveform shown in FIG. 14(D).

Thereby, the user can distinctively recognize that the input by the load standard P1 or the input at the load standard P2 to each of the input objects is received appropriately by the input apparatus.

INDUSTRIAL APPLICABILITY

According to the input apparatus of the present invention, the pressure load on the input unit of the touch panel is detected, and sets a load standard for receiving a pressure input to an input object and a load standard for receiving a pressure input to another input object adjacent to the input object to be different from each other. Thereby, even if multiple input objects are displayed at adjacent positions on the input unit of a small touch panel, the user can distinctively input to each of the input objects.

Especially if a pressure load of a pressure input to an input object with the low load standard satisfies a load standard for receiving a pressure input to an input object with the high load standard, the pressure input to the input object with the low load standard is not received. Accordingly, even if the user performs a pressure input to the input object with the low load standard by mistake, in spite of the intention to perform the pressure input to the input object with the high load standard, the pressure input to the input object unintended by the user is not received. Thereby, it is possible to avoid start of an unintended operation because of the unintended input by the user.

REFERENCE SIGNS LIST

10 mobile phone
20 control unit
30 touch panel
32 display unit
34 input unit
40 load detection unit
50 vibration unit
60 memory unit
70 audio input unit
80 audio output unit
90 key input unit

The invention claimed is:

1. An input apparatus comprising:
a display unit configured to display an input object;
an input unit configured to detect a pressure input to the input object displayed on the display unit;
a load detection unit configured to detect a pressure load on the input unit; and
a control unit configured to control to receive the pressure input when the pressure load detected by the load detection unit satisfies a load standard, wherein
the control unit determines whether the input object is adjacent to another input object,
the control unit controls, based on a result of the determination, such that a first load standard for receiving a pressure input to the input object is lower than a second load standard for receiving a pressure input to another input object, and
the control unit controls such that a pressure input is not received if a pressure load of the pressure input to the input object with the first load standard satisfies the second load standard.

2. The input apparatus according to claim 1, wherein the control unit controls such that a pressure input is not received if a pressure load of the pressure input to an input object with the first load standard falls down to be lower than the second load standard after satisfying the second load standard.

* * * * *